United States Patent [19]
Yamamoto et al.

[11] Patent Number: 5,712,842
[45] Date of Patent: Jan. 27, 1998

[54] OPTICAL PICK-UP DEVICE

[75] Inventors: Kenji Yamamoto, Saitama; Fumisada Maeda, Tokyo; Isao Ichimura, Kanagawa; Kiyoshi Ohsato, Chiba; Toshio Watanabe, Kanagawa, all of Japan

[73] Assignee: Sony Corporation, Tokyo, Japan

[21] Appl. No.: 744,007

[22] Filed: Feb. 12, 1996

[30] Foreign Application Priority Data

Feb. 15, 1995 [JP] Japan ................................ 7-026563

[51] Int. Cl.$^6$ ............................................. G11B 7/00
[52] U.S. Cl. ............................... 369/112; 369/44.23
[58] Field of Search .......................... 369/43, 44.11, 369/44.14, 44.22, 44.23, 44.32, 112; 250/201.5

[56] References Cited

U.S. PATENT DOCUMENTS

| | | | |
|---|---|---|---|
| 4,610,515 | 9/1986 | Tanaka | 369/112 X |
| 5,058,091 | 10/1991 | Murao et al. | 369/112 X |
| 5,631,885 | 5/1997 | Brazas, Jr. | 369/44.23 |
| 5,638,221 | 6/1997 | Maruyama et al. | 369/112 X |

*Primary Examiner*—Paul W. Huber
*Attorney, Agent, or Firm*—Ronald P. Kananen

[57] ABSTRACT

There is provided an optical pick-up device capable of eliminating a spherical aberration due to a thickness error of an optical disc. The optical pick-up device includes a convex lens having a flat surface opposed to a surface of an optical recording medium, and having a predetermined refractive index, and an objective lens disposed such that the convex lens is interposed between said optical recording medium and the objective lens. A position-detecting means detects a position relation between the light-incident surface of the optical recording medium and the flat surface of the convex lens, based on first and second detection signals. A drive means drives the convex lens along an optical axis thereof such that the convex lens is caused to move in the opposite directions toward the optical recording medium or the objective lens, whereby a distance between the light-incident surface of the optical recording medium and the flat surface of the convex lens is controlled based on the first and second detection signals.

2 Claims, 5 Drawing Sheets

OPTICAL PICK-UP DEVICE

BACKGROUND OF THE INVENTION

1. Field of the Invention

This invention relates to an optical pick-up device for converging a light emitted from a light source on a signal-recording surface of a optical recording medium such as optical disc.

2. Prior Art

Recently, there has been used a highly-densified disc-like recording medium or a magneto-optical disc in the field of a recording medium for computers or package media for storing sound or image information. One method suggested to achieve such a high-densification of the recording medium includes increasing a numerical aperture of an objective lens used in an optical pick-up device and reducing a spot size (diameter) of a light focused on a signal-recording surface of the optical disc.

For example, in the event that highly-densified information signals already stored on the optical disc in the form of information pits are read out by the optical pick-up device, it is required that the afore-mentioned spot size of the read beam is as small as possible to reproduce information from the pits formed as fine recording marks on the optical disc, whereby a high density recording can be achieved.

Incidentally, as the numerical aperture of the objective lens used in the optical pick-up device becomes large, the objective lens itself is difficult to produce. Further, it leads to a high production cost.

In addition, when a thickness of the afore-mentioned optical disc is offset from a prescribed value, a spherical aberration occurs. The spherical aberration $W_{40}$ is represented by the following equation (1):

$$W_{40} = \frac{\Delta t}{8} \cdot \frac{N^2 - 1}{N^3} NA^4 \quad (1)$$

wherein $\Delta t$ represents an error of thickness of the optical disc, N represents a refractive index and NA represents a numerical aperture.

As will be understood form the equation (1), the spherical aberration $W_{40}$ is in proportion to the numerical aperture NA. That is, as the numerical aperture becomes large, a large spherical aberration is likely to occur. For this reason, the thickness of the optical disc must be controlled strictly. However, such a control disadvantageously results in low yield and high production cost.

SUMMARY OF THE INVENTION

It is therefore an object of the present invention to provide an optical pick-up device which not only shows a high numerical aperture of an objective lens used therein and achieve a small spot size of a read/write light beam converged to an optical recording medium to realize a high density recording but also reduces a spherical aberration occurring due to an error in thickness of the optical recording medium.

In accordance with the present invention, there is provided an optical pick-up device for converging a light beam emitted from a light source on a optical recording medium, comprising a convex lens having a flat surface opposed to a light-incident surface of the optical recording medium, and having a predetermined refractive index, an objective lens disposed such that the convex lens is interposed between the optical recording medium and the objective lens, a converging optical system for converging the light reflected from the light-incident surface of the optical recording medium and the flat surface of the convex lens, a first light-detecting means for detecting the light reflected from the light-incident surface of the optical recording medium and passing through the converging optical system to thereby generate a first detection signal, a second light-detecting means for detecting the light reflected from the flat surface of the convex lens and passing through the converging optical system to thereby generate a second detection signal, a position-detecting means for detecting a positional relation between the light-incident surface of the optical recording medium and the flat surface of the convex lens, based on the first and second detection signals; and a drive means for driving the convex lens based on the first and second detection signals such that the convex lens moves in the opposite directions along an optical axis thereof toward the optical recording medium or the objective lens, whereby a distance between the light-incident surface of the optical recording medium and the flat surface of said convex lens is controlled.

In this case, the first light-detecting means is disposed at position corresponding to a conjugate point relative to a converging point of the reflected light from the light-incident surface of the optical recording medium, and the second light-detecting means is disposed at position corresponding to a conjugate point relative to a converging point of the reflected light from the flat surface of the convex lens.

Thus, in the optical pick-up device according to the present invention, since the convex lens having a given refractive index is disposed between the objective lens and the optical recording medium, a total numerical aperture of the optical system can be increased. In addition, the positional relation between the light-incident surface of the optical recording medium and the flat surface of the convex lens is determined based on the detection signals from the light-detecting means so that the distance therebetween can be well controlled. For this reason, the spherical aberration occurring on the signal-recording surface of the optical recording medium is considerably reduced so that a reproduction characteristic of the optical recording medium can be increased.

DETAILED DESCRIPTION OF THE PREFERRED EMBODIMENT

Figure 1:
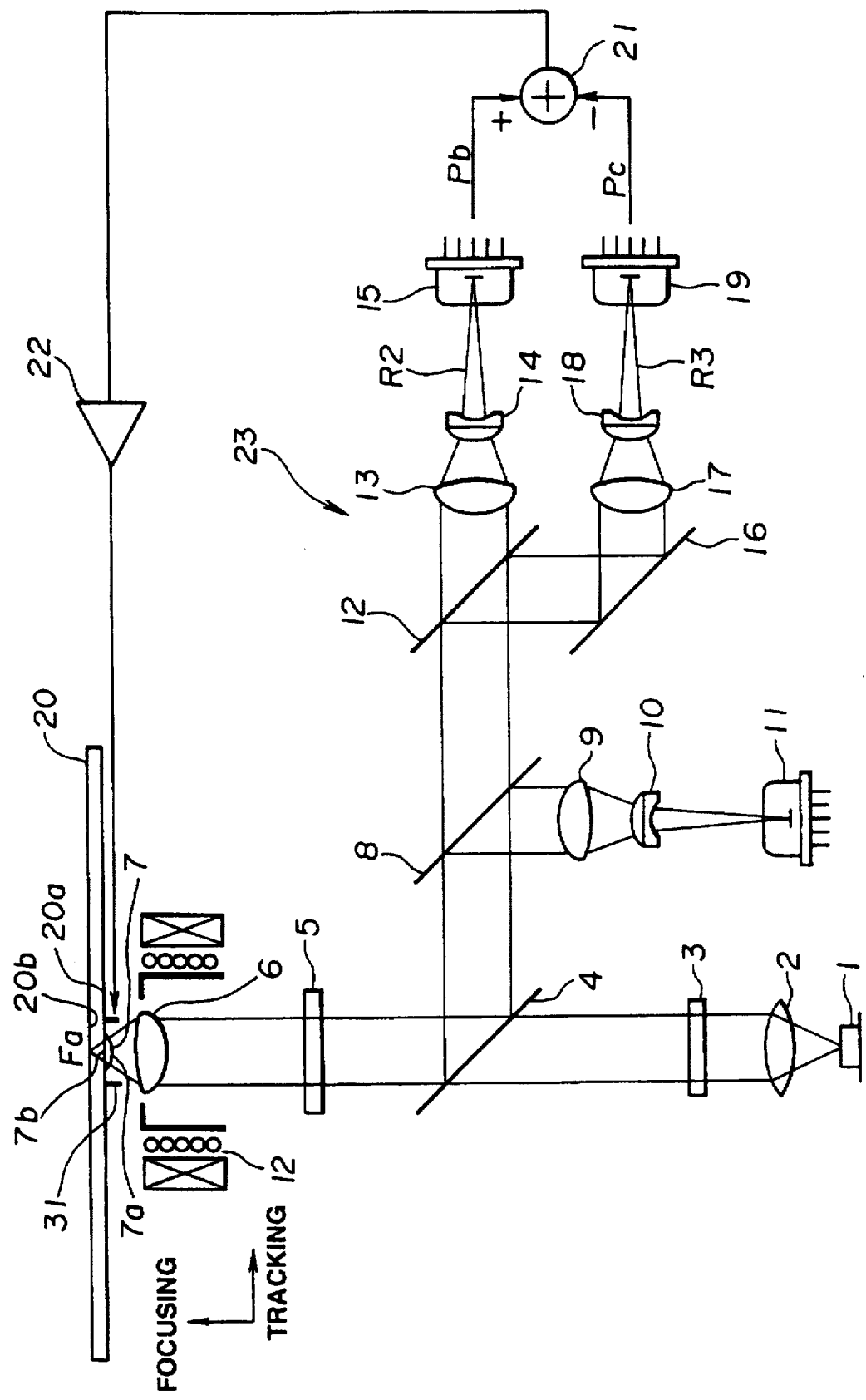
FIG. 1 is a schematic diagram showing an optical pick-up device according to one preferred embodiment of the present invention.

An optical pick-up device according to the present invention serves for reproducing highly-densified information signals already stored on a signal-recording surface of an optical recording medium 20 such as an optical disc. As shown in FIG. 1, the optical pick-up device includes (1) a semi-spherical lens 7 (convex lens) having a given refractive index and provided with a flat surface 7b opposed to a light-incident surface 20a of the optical disc 20, (2) a converging optical system 23 for converging reflected lights from the light-incident surface 20a of the optical recording medium 20 and the flat surface 7b of the semi-spherical lens 7, (3) a first photo-detector (hereinafter referred to merely as "PD") 15 as a first light-detecting means for detecting a light R2 reflected from the light-incident surface 20a and passing through the converging optical system 23, (4) a second PD 19 as a second light-detecting means for detecting a light R3 reflected from the flat surface 7b of the semi-spherical lens 7 and passing through the converging optical system 23, (5) a subtracter 21 for detecting a positional relation between the light-incident surface 20a of the optical recording medium 20 and the flat surface 7b of the semi-spherical lens 7 based on the detection outputs Pb and Pc of the first and second PDs 15 and 19, and an actuator 31 for driving the semi-spherical lens 7 along its optical axis in opposite directions toward the optical recording medium 20 or an objective lens 6 based on the output (Pb–Pc) of the subtracter 21 so as to control the a distance of a air layer (air gap) AG between the light-incident surface 20a of the optical recording medium 20 and the flat surface 7b of the semi-spherical lens 7.

In this case, the PD 15 is disposed at a position corresponding to the conjugate point relative the converging point of the light reflected from the light-incident surface 20a of the optical recording medium 20 and passing through the condensing optical system 23 while the PD 19 is disposed at a position corresponding to the conjugate point relative the converging point of the light reflected from the flat surface 7b of the semi-spherical lens 7 and passing through the condensing optical system 23. Both the PDs 15 and 19 are composed, for example, of four separate photo-detecting elements and serve to detect errors in the same manner as in a case where an astigmatism method is used. The outputs of the detection by the PDs are supplied to the subtracter 21 to detect a positional relation between the light-incident surface 20a of the optical recording medium 20 and the flat surface 7b of the semi-spherical lens 7.

Next, the detailed structure of the optical pick-up device is explained below. The optical pick-up device includes a laser diode 1 as a light source, from which a linearly polarized laser beam is emitted toward a collimator lens 2. The laser beam passing through the collimator lens 2 proceeds in the form of a parallel ray and then is diffracted through a diffraction grating 3. The diffracted laser beam further proceeds through a polarizing beam splitter 4 (hereinafter referred to as merely "PBS") and a ¼ wave-length plate 5 and then is incident on the objective lens 6 where the laser beam is converged and allowed to pass through the semi-spherical lens 7 toward the signal-recording surface 20b of the optical recording medium (optical disc) 20. Incidentally, the laser beam to be focused on the signal-recording surface of the optical recording medium 20 is changed from the linearly polarized light to a circularly polarized light by passing through the ¼ wave-length plate 5.

The reflected light from the signal-recording surface 20b of the optical recording medium 20 proceeds through the semi-spherical lens 7 and the objective lens 6 and is incident on the ¼ wave-length plate 5. The ¼ wave-length plate 5 serves to rotate the linearly polarized laser beam reflected back from the signal-recording surface 20b so that the polarization direction of the laser beam after passing through the ¼ wave-length plate is altered by an angle of 90 degrees. The rotated linearly polarized laser beam is then incident on the PBS 4 on which it is reflected at an angle of 90 degrees and proceeds toward a half mirror 8. The half mirror 8 serves for reflecting 50% of the laser beam toward a condensing lens 9 and permeating the remaining 50% of the laser beam. A beam splitter having the same optical characteristics may be used instead of the half mirror 8. The laser beam passing through the condensing lens 9 is converged and proceeds toward a multi-lens 10 where the laser beam is further converged on a photodetector 11.

The set of the PBS 4, the half mirror 8, the condensing lens 9 and the multi-lens 10 constitute the condensing (converging) optical system 23 together with another set of a half mirror 12, a condensing lens 13 and the multi-lens 14, and a further set of a mirror 16, a condensing lens 17 and a multi-lens 18, the latter two set being described below in detail.

The photodetector 11 is also composed of four separate photo-detecting elements whose outputs are supplied to a reproduction processing unit (not shown) to generate an RF signal for obtaining a reproduction data, a tracking error signal and a focusing error signal. In the reproduction processing unit, the RF signal is binarized and then the thus obtained binarized data is subjected to an EFM demodulation processing and a CIRC decoding processing, whereby the reproduction data is obtained from the RF signal. The tracking error signal and the focusing error signal are supplied to a servo circuit (not shown). This servo circuit carries out a tracking control and a focusing control based on the tracking error signal and the focusing error signal by using a biaxial actuator 12.

Figure 2:
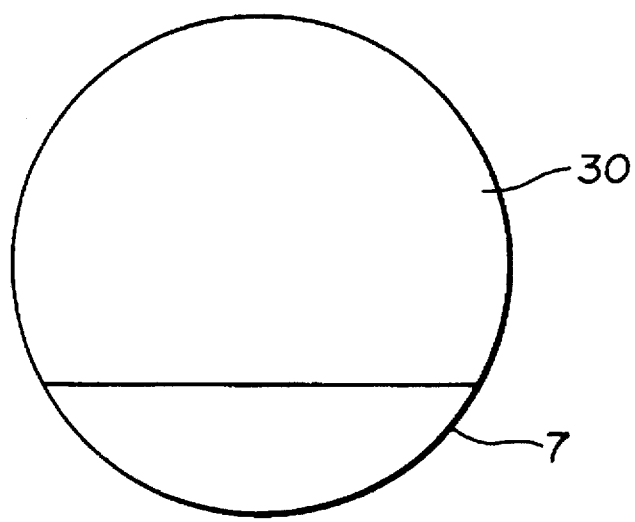
FIG. 2 is a view explaining a manufacturing step of a convex lens used in the optical pick-up device according to the present invention.

As shown in FIG. 2, the semi-spherical lens 7 can be manufactured by cutting a portion of a ball-like lens 30. A cut surface of the semi-spherical lens 7 is mirror-polished to form the flat surface 7b. The ball-like lens 30 may be made of a material having the same refractive index as that of a light-permeable layer of the optical recording medium 20.

The numerical aperture NA of the objective lens 6 is represented by the following equation:

$$NA = n \sin\theta$$

wherein θ is one-half of an angular aperture of an outgoing beam from the objective lens, and n is a refractive index of a light propagation medium. In this case, a refractive index of the semi-spherical lens 7 is set to, for example, 1.5 similarly to that of the light-permeable layer of the optical recording medium 20. Accordingly, a total numerical aperture of the optical pick-up device is, for example, 1.5 times that of the conventional optical pick-up devices in which only the objective lens is used to condense the laser beam passing through the propagation medium having the refractive index n of 1. For this reason, the spot size of the laser beam on the signal-recording surface 20b is set to ⅟1.5 so that a high density recording can be realized.

Meanwhile, in order to prevent a sliding friction between the flat surface 7a of the semi-spherical lens 7 and the light-incident surface 20a of the optical recording medium 20 when driving the optical recording medium 20, there is formed an air layer (air gap) AG therebetween.

Figure 3:
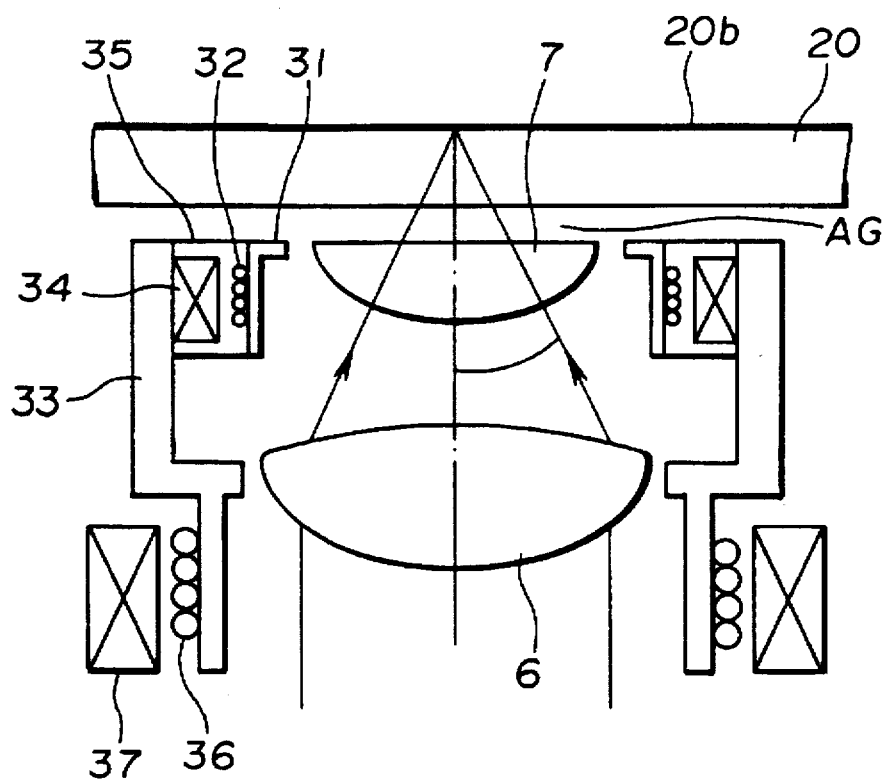
FIG. 3 is an enlarged view showing a detailed structure adjacent to the semi-spherical convex lens of the optical pick-up device according to the present invention.

FIG. 3 shows in detail a mutual relation between the air layer AG, the semi-spherical lens 7, the optical recording medium 20 and the objective lens 6. The semi-spherical lens 7 is supported on a first holder 31. The first holder 31 is provided with a first drive coil 32 fixedly mounted thereto. Whereas, the objective lens 6 is supported by a second holder 33 on which a magnet 34 is secured. The first holder 31 is movably supported through a plate spring 35 on the second holder 33. That is, a mutual effect between a magnetic flux of the magnet 34 and energizing of the first dive coil 32 enables the semi-spherical lens 7 and the objective lens 6 to move independently from each other in the direction of optical axes thereof. Further, the objective lens 6 is driven by an electromagnetic effect between a second drive coil 36 secured to the second holder 33 and the magnet 37. When a width of the air layer AG in the direction of thickness of the optical recording medium 20 is changed, a spherical aberration occurs. This spherical aberration $W'_{40}$ is represented by the following equation (2):

$$W_{40} = -\frac{\Delta h}{8} n^2(n^2 - 1)\sin^4\theta \quad (2)$$

wherein $\Delta h$ is a changing amount of thickness of the air layer AG, n is a combined refractive index of the optical recording medium 20 and the semi-spherical lens 7, and $\sin\theta$ is a combined numerical aperture thereof.

As the spherical aberration $W'_{40}$ represented by the equation (2) becomes large, a reproduction characteristic, when the information signal stored on the optical recording medium 20 is read out by the optical pick-up device, is deteriorated to a large extent.

In the optical pick-up device according to the preferred embodiment of the present invention, the spherical aberration $W'_{40}$ represented by the equation (2) is limited to a minimum level by using a semi-spherical lens-actuator constituted by the first holder 31, the first drive coil 32, the magnet 34 and the plate spring 35. The semi-spherical lens-actuator drives the semi-spherical lens along the optical axis thereof toward the optical recording medium 20 or the objective lens 6, whereby the thickness of the air layer AG is controlled with high accuracy.

Figure 4:
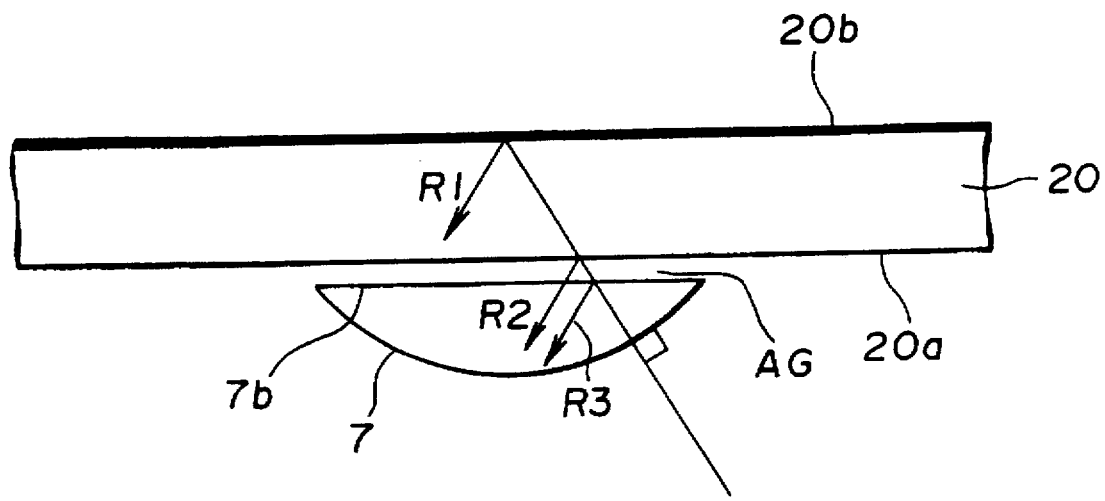
FIG. 4 is an enlarged view for explaining reflecting lights from the optical recording medium and the semi-spherical convex lens.

In the followings, a construction and a principal operation of the optical pick-up device according to the present invention are described by referring to FIG. 4. As shown in FIG. 4, a reflected light from the optical recording medium 20 is composed of a first reflected light component R1 from the signal-recording surface 20a, a second reflected light component R2 from the light-incident surface 20a and a third reflected light component R3 from the flat surface 7b of the semi-spherical lens 7. The first reflected light component R1 is introduced into the PD 11 as shown in FIG. 1. Only 50% of the second reflected light component R2 permeates through the half mirror 8. Further, only a half of the 50% of the second reflected light component R2 can permeate through the half mirror 12 and then is introduced into the PD 15. These half mirrors can be replaced with beam splitters. Similarly, only 50% of the third reflected light component R3 permeates through the half mirror 8 and only a half of the 50% of the third reflected light component R3 can permeate through the half mirror 12. A portion of the third reflected light component R3, which is reflected on the half mirror 12, proceeds toward the mirror 18 where a total reflection of the portion of the third reflected light component R3 occurs, whereby the third reflected light component R3 is introduced to the PD 19 through the condensing lens 17 and the multi-lens 18. The PDs 15 and 19 are similarly composed of four separate photo-detecting elements. The multi-lens 10, 14 and 18 are each composed of a cylindrical lens and a condensing lens as used in an astigmatism method.

The PD 15 detects an output of the second reflected light component R2 from the light-incident surface 20a of the optical recording medium 20. In this case, the output to be detected is identical to an output as used in the astigmatism method. Similarly, the PD 19 detects an output of the third reflected light component R3 which is also identical to an output as used in the astigmatism method. The subtracter 21 carries out a subtraction of the detected output Pc of the PD 19 from the detected output Pb of the PD 15. The thus-obtained difference signal Pb−Pc is supplied to a driver 22 from which the difference signal is further supplied to the drive coil 32 of the semi-spherical lens-actuator.

Figure 5:
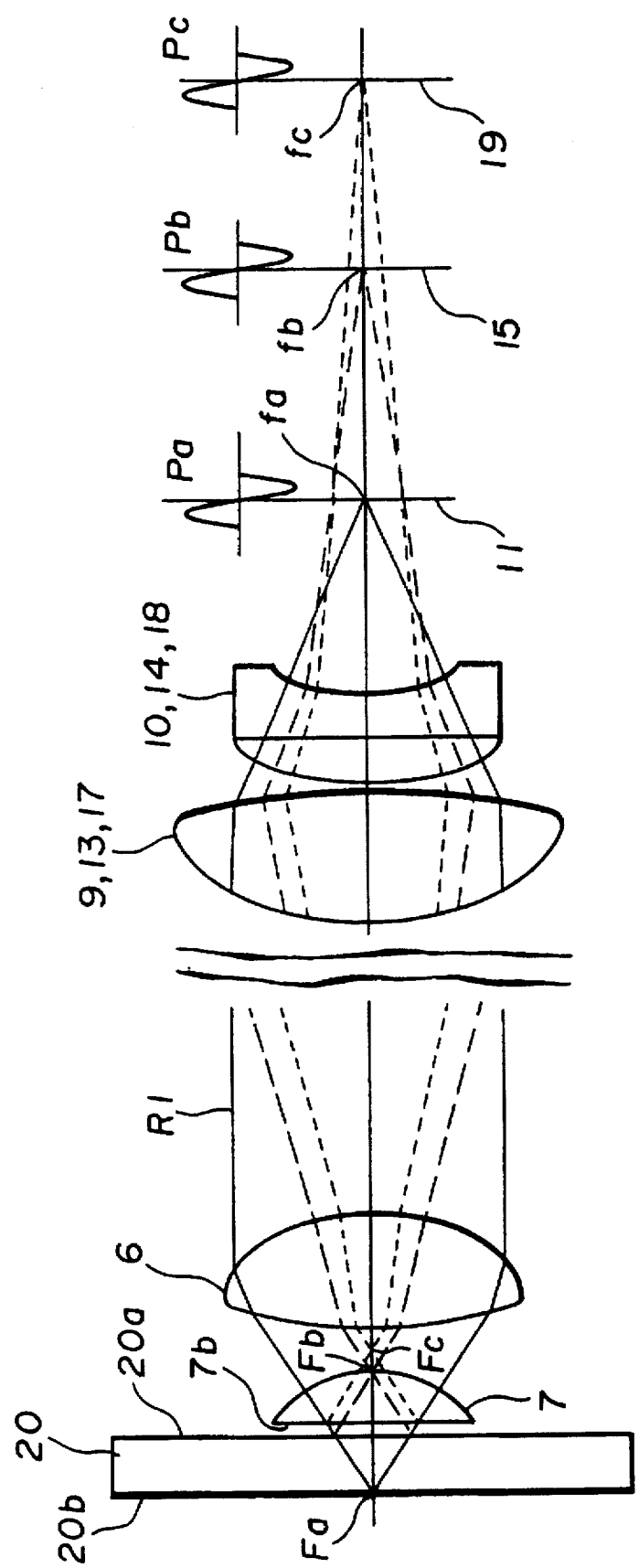
FIG. 5 is a view showing a positional relation between photo-detectors as light-detecting means, according to the preferred embodiment of the present invention.

The respective PDs 11, 15 and 19 are disposed at such positions preliminarily adjusted depending upon focusing points of the respective first, second and third reflected light components R1, R2 and R3. A position control for the respective PDs is explained below by referring to FIG. 5. In FIG. 5, optical paths of the respective first to third reflected light components R1 to R3 are indicated on the same optical axis in an overlapped manner for the sake of clarity.

The PD 11 is disposed at a position corresponding to a conjugate point fa relative to a focusing point Fa on the signal-recording surface 20b of the optical recording medium 20. The position of the conjugate point fa relative to the focusing point Fa is determined by arrangement of the PBS 4, the half mirror 8, the condensing lens 9 and the multi-lens 10 intervened therebetween. Similarly, the PD 15 is disposed at a position corresponding to a conjugate point fb relative to the converging point Fb of the second reflected light component R2 from the light-incident surface 20a of the optical recording medium 20. The position of the conjugate point fb relative to the focusing point Fb is determined by arrangement of the PBS 4, the half mirror 8, the condensing lens 13 and the multi-lens 14 intervened therebetween. In addition, the PD 19 is disposed at a position corresponding to a conjugate point fc relative to a focusing point Fc of the third reflected light component R3 from the flat surface 7b of the semi-spherical lens 7. The position of the conjugate point fc relative to the focusing point Fc is determined by arrangement of the PBS 4, the half mirrors 8 and 12, the mirror 16, the condensing lens 17 and the multi-lens 18 intervened therebetween.

Specifically, focusing the objective lens 6 is controlled at the PD 11 by using an astigmatism method. At this time, a focusing bias is set to zero. When the semi-spherical lens 7 gradually approaches while maintaining the focused condition, the PDs 15 and 19 detect S-shaped signal outputs Pb and Pc of the reflected light components, respectively. The two S-shaped signal outputs Pb and Pc are electrically so controlled that their amplitudes, namely a peak-to-peak width, become identical. The semi-spherical lens 7 is fixed in proximity of a position where each waveform of the two S-shaped signal outputs Pb and Pc crosses a zero point. While maintaining the semi-spherical lens 7 in this fixed condition, Z-lengths of the multi-lens 14 and the multi-lens 18 are aligned with each other such that the output Pb of the PD 15 and the output Pc of the PD 19 both are to zero. This alignment of the Z-lengths of the multi-lens 14 and 18 means that phases of the two S-shaped signal outputs obtained from the PDs 15 and 19, which correspond to the positions of the light-incident surface 20a of the optical recording medium 20 and the flat surface 7a of the semi-spherical lens 7, are aligned with each other. Thus, the PDs 11, 15 and 19 are adjusted with respect to their positions.

Next, a control procedure for the air layer AG is explained below.

In order to maintain the air layer AG constant, the outputs Pb and Pc of the PDs 15 and 19 must be controlled such that the difference signal "Pb—Pc" as a position-detecting signal from the subtracter 21 becomes zero. To this end, the position of the semi-spherical lens 7 is adjusted by energizing the drive coil 32 of the semi-spherical actuator by using the driver 22.

The output Pb of the PD 15 and the output Pc of the PD 19 correspond to the positions of the converging points Fb and Fc relative to the objective lens 6, respectively. Specifically, when the light-incident surface 20a of the optical recording medium 20 and the flat surface 7b of the semi-spherical lens 7 are offset from each other, the focusing points Fb and Fc are also offset from each other so that the signal outputs Pb and Pc of the PDs 15 and 19 are caused to vary correspondingly. At this time, if the thickness of the air layer AG is kept unchanged, displacement of the focusing points Fb and Fc relative to the objective lens 6 are identical so that the signal outputs Pb and Pc of the PDs 15 And 19 are in the form of S-shaped signal outputs having almost identical phases. Accordingly, if the output Pb—Pc from the subtracter 21 is zero, it is considered that the thickness of the air layer AG is kept constant. In consequence, the difference signal Pb—Pc functions as a gap error signal.

In the followings, there is explained the case where the air gap is changed.

Figure 7:
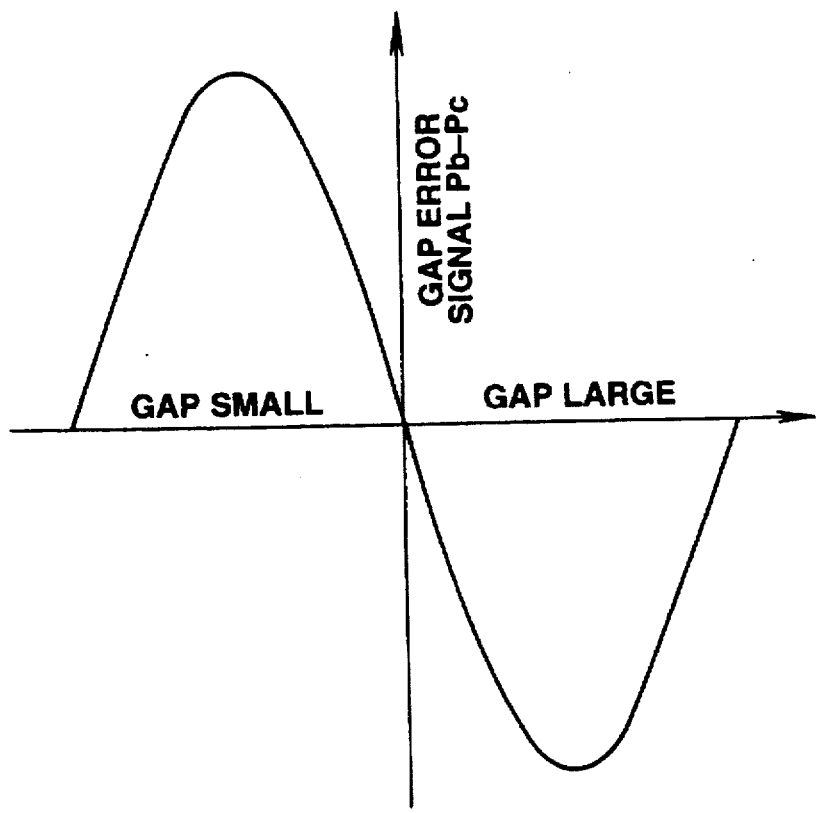
FIG. 7 is a graph showing a relation between a gap (air layer) between the optical recording medium and the semi-spherical convex lens and a gap-error signal for controlling the gap.
Figure 6A:
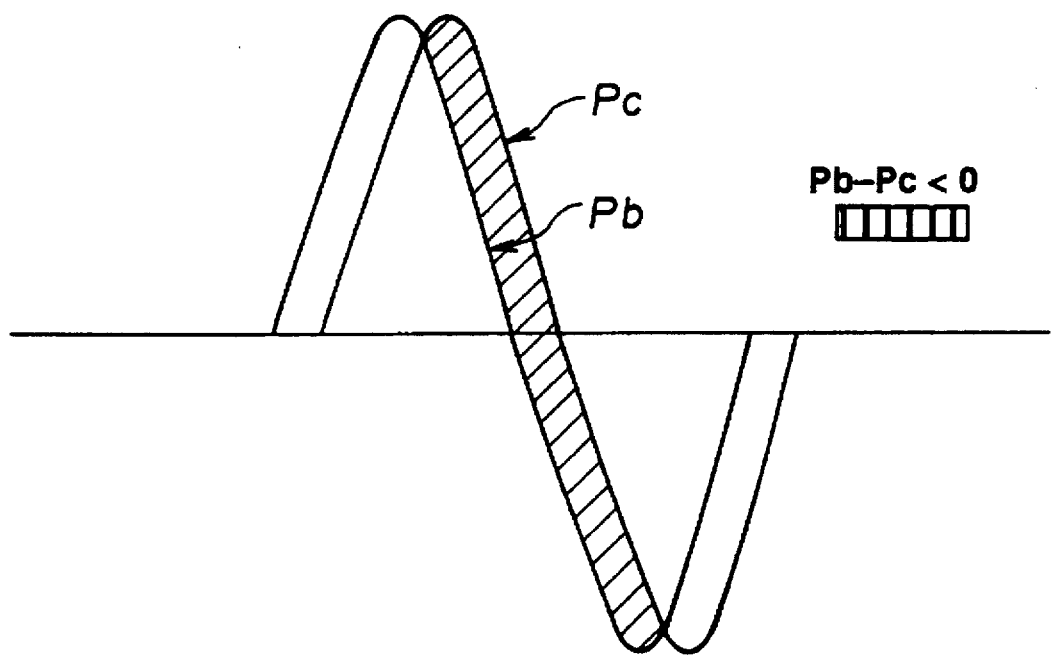
FIGS. 6A and 6B are graphs showing a relation between a detection output for the reflecting light from the semi-spherical convex lens and the position of the semi-spherical convex lens.
Figure 6B:
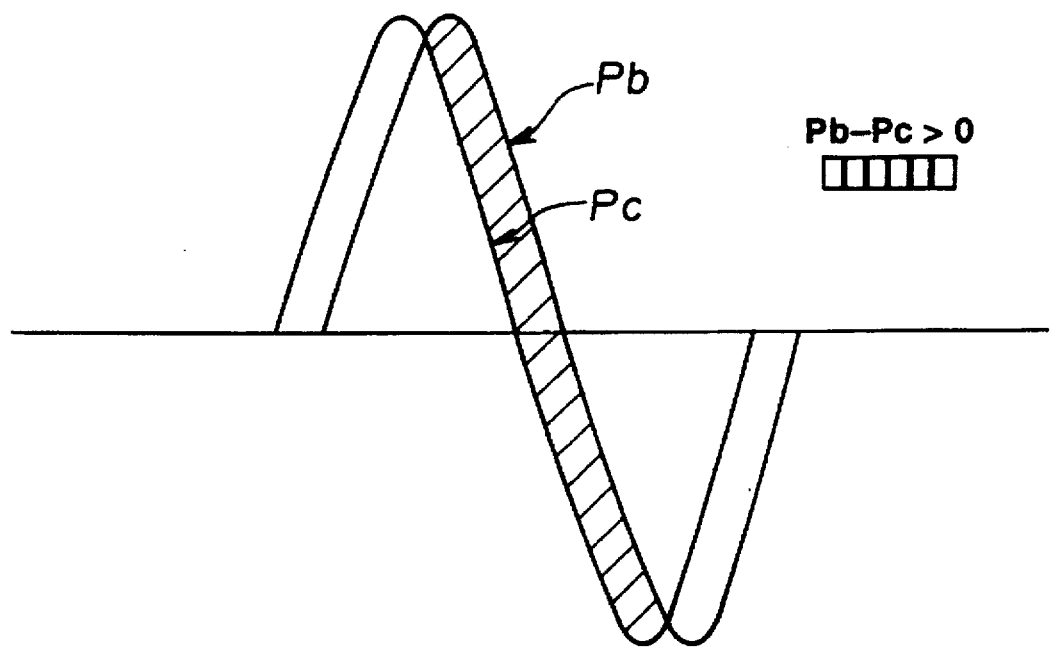

As shown in FIGS. 6A and 6B, the output Pb of the PD 15 and the output Pc of the PD 19 are indicated by the S-shaped waveforms. When the thickness of the air layer AG is large, the waveform of the output Pc of the PD 19 is offset rightward as viewed in FIG. 6A from that of the output Pb of the PD 15. On the other hand, when the thickness of the air layer AG is small, the waveform of the output Pc of the PD 19 is offset leftward as viewed in FIG. 6B from that of the output Pb of the PD 15. Therefore, the gap error signal Pb—Pc calculated by the subtracter 21 varies as shown in FIG. 7. That is, when the thickness of the air layer AG becomes large, the gap error signal Pb—Pc is negative. On the other hand, when the thickness of the air layer AG becomes small, the gap error signal Pb—Pc is positive. Accordingly, if the semi-spherical lens 7 is driven by energizing the drive coil 32 of the semi-spherical lens-actuator such that the gap error signal Pb—Pc becomes small, the thickness of the air layer AG can be kept almost constant.

Thus, in accordance with the present invention, the air layer (air gap) AG between the semi-spherical lens 7 and the optical recording medium (optical disc) 20 can be controlled with a high accuracy to thereby prevent occurrence of the spherical aberration. As a result, a high reproduction characteristic for the optical recording medium can be realized.

Meanwhile, commercially available optical discs inevitably show a difference in thickness therebetween (thickness error). The thickness error also causes a spherical aberration. According to the present invention, such a spherical aberration due to the thickness error can be effectively prevented in a similar manner.

Specifically, either the PD 15 or the PD 19 is applied with an electrical bias so as to optimize a reproduction characteristic of the RF signal obtained from the detection output of the PD 11. As a result, there occurs an air gap bias corresponding to the electrical bias whereby the air layer AG can be controlled with a high accuracy. More specifically, the control causes a spherical aberration acting in an inverse relation to that caused by the thickness error of the optical disc so that the two spherical aberrations having different signs are balanced against each other to eliminate the spherical aberration due to the thickness error. Accordingly, it will be appreciated that, even though the optical disc has a thickness error, occurrence of a spherical aberration can be eliminated by using the optical pick-up device according to the present invention so that an excellent reproduction characteristic can be achieved.

What is claimed is:

1. An optical pick-up device for focusing a light emitted from a light source on a optical recording medium, comprising:

a convex lens having a flat surface opposed to a light-incident surface of said optical recording medium, and having a predetermined refractive index;

an objective lens disposed such that said convex lens is interposed between said optical recording medium and the objective lens;

a converging optical system for converging the light reflected from the light-incident surface of the optical recording medium and the flat surface of said convex lens;

a first light-detecting means for detecting the light reflected from the light-incident surface of said optical recording medium and passing through said converging optical system, and generating a first detection signal;

a second light-detecting means for detecting the light reflected from the flat surface of said convex lens and passing through said converging optical system, and generating a second detection signal;

a position-detecting means for detecting a positional relation between said the light-incident surface of said optical recording medium and the flat surface of said convex lens, based on said first and second detection signals; and a drive means for driving said convex lens along an optical axis thereof such that said convex lens moves in the opposite directions toward said optical recording medium or said objective lens, whereby a distance between the light-incident surface of said optical recording medium and the flat surface of said convex lens is controlled corresponding to said first and second detection signals.

2. The optical pick-up device according to claim 1, wherein said first light-detecting means is disposed at a conjugate point of the light reflected from the light-incident surface of said optical recording medium and passing through said converging optical system, relative to a converging point thereof, and said second light-detecting means is disposed at a conjugate point of the light reflected from the flat surface of said convex lens and passing through said converging optical system, relative to a converging point thereof.

* * * * *